US009912762B2

(12) United States Patent
Zhang et al.

(10) Patent No.: US 9,912,762 B2
(45) Date of Patent: Mar. 6, 2018

(54) METHOD FOR DISPLAYING SPLASH SCREEN CONTENT, TERMINAL, CONTENT SERVER, AND SYSTEM THEREFOR

(71) Applicant: Tencent Technology (Shenzhen) Company Limited, Shenzhen, Guangdong (CN)

(72) Inventors: Jing Zhang, Shenzhen (CN); Chen Zhang, Shenzhen (CN); Danzhi Chen, Shenzhen (CN); Peng Dong, Shenzhen (CN); Yufei Liu, Shenzhen (CN); Jie Hou, Shenzhen (CN); Jun Ye, Shenzhen (CN); Meina Li, Shenzhen (CN); Yang Li, Shenzhen (CN); Qunli Ma, Shenzhen (CN); Nian Liu, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 289 days.

(21) Appl. No.: 14/249,171

(22) Filed: Apr. 9, 2014

(65) Prior Publication Data
US 2014/0302827 A1    Oct. 9, 2014

Related U.S. Application Data

(63) Continuation of application No. PCT/CN2012/081523, filed on Sep. 18, 2012.

(30) Foreign Application Priority Data

Oct. 10, 2011  (CN) .......................... 2011 1 304855

(51) Int. Cl.
*H04L 29/06* (2006.01)
*H04L 29/08* (2006.01)
(Continued)

(52) U.S. Cl.
CPC .............. *H04L 67/18* (2013.01); *H04W 4/02* (2013.01); *H04W 4/16* (2013.01); *G06F 9/4401* (2013.01)

(58) Field of Classification Search
CPC .......... H04L 67/18; H04W 4/02; H04W 4/16; G06F 9/4401
(Continued)

(56) References Cited

U.S. PATENT DOCUMENTS

| 2004/0130580 A1* | 7/2004 | Howard | ................ H04H 20/38 |
| | | | 715/854 |
| 2008/0113656 A1* | 5/2008 | Lee | ...................... H04L 67/325 |
| | | | 455/414.3 |

(Continued)

FOREIGN PATENT DOCUMENTS

| CN | 101211349 A | 7/2008 |
| CN | 101212599 A | 7/2008 |

(Continued)

OTHER PUBLICATIONS

International Search Report for PCT/CN2012/081523, dated Dec. 27, 2012; 4 pages.
(Continued)

*Primary Examiner* — Kathy Wang-Hurst
*Assistant Examiner* — Said Elnoubi
(74) *Attorney, Agent, or Firm* — Dilworth & Barrese, LLP

(57) ABSTRACT

The present disclosure relates to a method for displaying splash screen content, a terminal, a content server, and a system therefor. The method includes: receiving a content request sent by a terminal, the content request carrying first time and/or a geographical location of the terminal, the first time being time when the terminal last requests splash screen content; acquiring splash screen content according to
(Continued)

the first time and/or the geographical location of the terminal; and sending the splash screen content to the terminal such that the terminal displays the splash screen content. The content server includes: a first receiving module, a first acquiring module, and a first sending module. The terminal includes: a second sending module, a second receiving module, and a display module. The system includes: a terminal and a content server. The present disclosure enhances personality and interest of a terminal product and improves user experience.

12 Claims, 7 Drawing Sheets

(51) Int. Cl.
    *H04W 4/16*     (2009.01)
    *H04W 4/02*     (2018.01)
    *G06F 9/44*     (2018.01)

(58) Field of Classification Search
    USPC .................. 455/414.1–414.3, 456.1–457
    See application file for complete search history.

(56) References Cited

U.S. PATENT DOCUMENTS

| | | | |
|---|---|---|---|
| 2009/0177453 A1 | 7/2009 | Kouchi et al. | |
| 2010/0086117 A1* | 4/2010 | Scott | H04M 1/2535 |
| | | | 379/201.06 |
| 2011/0054776 A1* | 3/2011 | Petrov | G01C 21/3694 |
| | | | 701/533 |

FOREIGN PATENT DOCUMENTS

| | | |
|---|---|---|
| CN | 101359291 A | 2/2009 |
| CN | 101697559 A | 4/2010 |
| CN | 101883318 A | 11/2010 |
| CN | 102043171 A | 5/2011 |
| CN | 102202196 A | 9/2011 |
| EP | 1995680 A2 | 11/2008 |

OTHER PUBLICATIONS

Chinese Office Action dated Apr. 29, 2016.
Chinese Office Action dated Dec. 29, 2016.

* cited by examiner

METHOD FOR DISPLAYING SPLASH SCREEN CONTENT, TERMINAL, CONTENT SERVER, AND SYSTEM THEREFOR

This application is a continuation application of International Application No. PCT/CN2012/081523, filed Sep. 18, 2012, which claims the benefit of Chinese Patent Application No. 201110304855.X, filed on Oct. 10, 2011 and entitled "METHOD FOR DISPLAYING SPLASH SCREEN CONTENT, TERMINAL, CONTENT SERVER, AND SYSTEM THEREFOR." Each of these prior applications is incorporated herein by reference in its entirety.

TECHNICAL FIELD

The present disclosure relates to the field of Internet communications, and in particular, to a method for displaying splash screen content, a terminal, a content server, and a system therefor.

BACKGROUND

At present, more and more terminal products such as mobile phones gain popularity among people. When a terminal is started, a splash screen interface (i.e., startup image) is displayed on the terminal, and splash screen content is displayed on the splash screen interface of the terminal. The splash screen content is typically a logo or element representing a company's brand image. For example, when a mobile phone is started, a splash screen interface is displayed, and a brand-representative logo is displayed on the splash screen interface of the mobile phone.

A logo or element representing a company's brand image is displayed as the splash screen content such that the terminal product lacks personality and interest, and user experience deteriorates.

SUMMARY

To enhance personality and interest of a terminal product and improve user experience, embodiments of the present disclosure provide a method for displaying splash screen content, a terminal, a content server, and a system therefor. The technical solutions are as follows:

A method for display splash screen content includes:

receiving a content request sent by a terminal, the content request carrying first time and/or a geographical location of the terminal, the first time being time when the terminal last requests splash screen content;

acquiring splash screen content according to the first time and/or the geographical location of the terminal; and sending the splash screen content to the terminal such that the terminal displays the splash screen content.

A method for display splash screen content includes:

sending, by a terminal, a content request to a content server, the content request carrying at least first time and/or a geographical location of the terminal, the first time being time when the terminal last requests splash screen content;

receiving, by the terminal, splash screen content sent by the content server, the splash screen content being acquired by the content server according to the geographical location of the terminal and/or the first time; and displaying, by the terminal, the received splash screen content.

A content server includes:

a first receiving module, configured to receive a content request sent by a terminal, the content request carrying first time and/or a geographical location of the terminal, the first time being time when the terminal last requests splash screen content;

a first acquiring module, configured to acquire splash screen content according to the first time and/or the geographical location of the terminal; and a first sending module, configured to send the splash screen content to the terminal such that the terminal displays the splash screen content.

A terminal includes:

a second sending module, configured to send a content request to a content server, the content request carrying at least first time and/or a geographical location of the terminal, the first time being time when the terminal last requests splash screen content;

a second receiving module, configured to receive splash screen content sent by the content server, the splash screen content being acquired by the content server according to the geographical location of the terminal and/or the first time; and a display module, configured to display the received splash screen content.

A system for displaying splash screen content includes the content server and the terminal.

According to the embodiments of the present disclosure, a terminal sends a content request to a server, the server acquires splash screen content and sends the acquired splash screen content to the terminal, and the terminal displays the splash screen content, thereby enhancing personality and interest of a terminal product, and improving user experience.

DETAILED DESCRIPTION

To make the technical solutions and advantages of the present disclosure clearer, the embodiments of the present disclosure are described in detail below with reference to the accompanying drawings.

Figure 1:
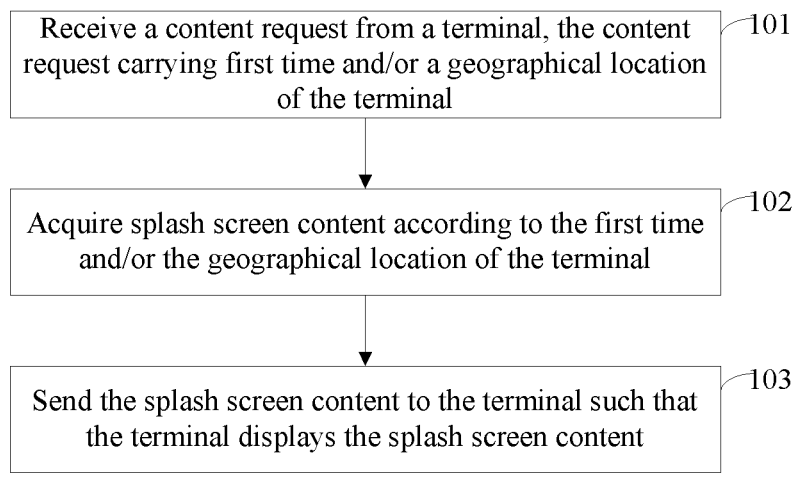
FIG. 1 is a flowchart of a method for displaying splash screen content according to an embodiment of the present disclosure.

As shown in FIG. 1, an embodiment of the present disclosure provides a method for displaying splash screen content, including the following steps:

step 101: receiving a content request sent by a terminal, the content request carrying first time and/or a geographical location of the terminal, the first time being time when the terminal last requests splash screen content;

step 102: acquiring splash screen content according to the first time and/or the geographical location of the terminal; and step 103: sending the splash screen content to the terminal such that the terminal displays the splash screen content.

According to the embodiment of the present disclosure, a terminal sends a content request to a server, the server acquires splash screen content and sends the acquired splash screen content to the terminal, and the terminal displays the splash screen content, such that the terminal displays different splash screen content, thereby enhancing personality and interest of a terminal product, and improving user experience.

Figure 2:
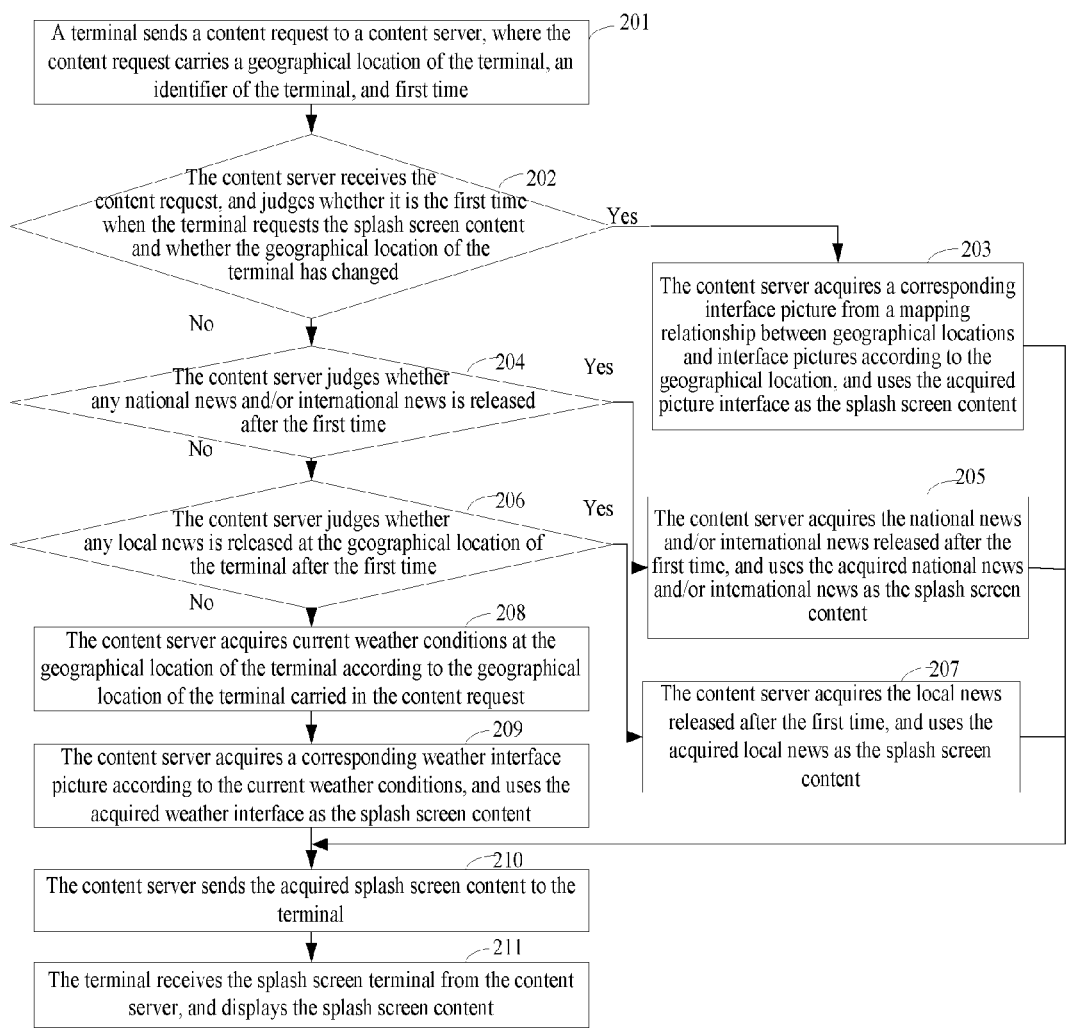
FIG. 2 is a flowchart of a method for displaying splash screen content according to an embodiment of the present disclosure.

An embodiment of the present disclosure provides a method for displaying splash screen content. When a terminal is powered on and started, the terminal displays a splash screen interface, and is capable of displaying splash screen content on the splash screen interface according to the method of this embodiment. Referring to FIG. 2, the method includes the following steps:

Step 201: A terminal sends a content request to a content server, where the content request carries a geographical location of the terminal, an identifier of the terminal, and first time, where the first time is the time when the terminal last requests splash screen content.

The terminal is internally provided with a Global Positioning System (GPS) positioning module, and is capable of reading the geographical location thereof from its GPS positioning module. In addition, the geographical location of the terminal may be the city where the terminal is located. The first time is the time when the terminal last requests splash screen content, and is pre-cached by the terminal.

Step 202: The content server receives the content request sent by the terminal, and judges whether it is the first time the terminal requests the splash screen content and whether the geographical location of the terminal has changed; if it is the first time the terminal requests the splash screen content and the geographical location of the terminal has changed, step 203 is performed; if it is not the first time the terminal requests the splash screen content and the geographical location of the terminal has not changed, step 204 is performed.

The content server stores a mapping relationship between terminal identifiers and geographical locations, and the geographical location stored in any piece of record in the mapping relationship between terminal identifiers and geographical locations is a geographical location where the terminal corresponding to a terminal identifier stored in the piece of record locates when it last requests the splash screen content.

Specifically, the content server searches, according to the terminal identifier carried in the content request, in the stored mapping relationship between terminal identifiers and geographical locations; if the geographical location where the terminal locates at the time it last requests the splash screen content is not found, the content server judges that it is the first time the terminal requests the splash screen content; and if the geographical location where the terminal locates at the time it last requests the slash screen content is found, the content server compares the geographical location carried in the content request with the geographical location where the terminal locates at the time it last requests the splash screen content; if the two geographical locations are identical, the content server judges that the geographical location of the terminal has not changed; and if different, the content server judges that the geographical location of the terminal has changed.

Furthermore, if judging that it is the first time the terminal requests the splash screen content, the content server may treat the terminal identifier and the geographical location of the terminal that are carried in the content request as a piece of record and store it into the mapping relationship between terminal identifiers and geographical locations.

Furthermore, if judging that the geographical location of the terminal has changed, the content server updates the found geographical location where the terminal locates at the time it last requests the splash screen content into the geographical location carried in the content request.

Furthermore, upon receiving the content request, the content server may also acquire current time, determine a time range that the acquired time falls within, acquire a corresponding background picture from a stored mapping relationship between time ranges and background pictures, and use the acquired background picture as a background picture of the splash screen content.

In this embodiment, a person skilled in the art may divide a whole year into a plurality of time ranges, assign a background picture to each time range, and store each time range and the background picture corresponding thereto into the mapping relationship between time ranges and background pictures.

Specifically, a person skilled in the art may assign a background picture to each time range in consideration of such factors as holiday or festival during the time range. For example, if the time range covers the Moon Festival, a person skilled in the art may assign a background picture with its subject of Moon Festival to the time range.

In this embodiment, a default background picture may be preset in the content server; correspondingly, upon receiving the content request, the content server may directly acquire the default background picture and use the default background picture as a background picture of the splash screen content.

Step 203: The content server acquires a corresponding interface picture from a mapping relationship between geographical locations and interface pictures according to the geographical location carried in the content request, and uses the acquired interface picture as the splash screen content; and step 210 is subsequently performed.

In this embodiment, a person skilled in the art may assign an interface for each geographical location according to elements such as histories and cultures, natural sceneries, and/or humane features at the geographical location, and store each geographical location and the interface picture corresponding thereto into the mapping relationship between geographical locations and interface pictures. For example, as regards Beijing, a person skilled in the art may assign an interface picture whose subject is composed of such elements as red walls, stone lions, and tiles according to histories and cultures of Beijing, and store Beijing and the interface picture assigned to Beijing into the mapping relationship between geographical locations and interface pictures.

In this embodiment, if the background picture of the splash screen content fails to be acquired, the acquired interface picture may be directly used as the splash screen content.

Step 204: The content server judges whether any national news and/or international news is released after the first time; if released, step 205 is performed; if not, step 206 is performed.

The content server stores a news queue which is used to cache national news and/or international news. A person skilled in the art may cache recently released national news and/or international news into the news queue in the content server. In addition, release time is recorded for each piece of national news and/or international news stored in the news queue, and the national news and/or international news includes political news, entertainment news, and/or current affair news.

Specifically, the content server judges whether the new queue includes any national news and/or international news released after the first time; if true, the content server judges that national news and/or international news is released after the first time; if false, the content server judges that no national news and/or international news is released after the first time.

Step 205: The content server acquires the national news and/or international news released after the first time, and uses the acquired national news and/or international news as the splash screen content; and step 210 is subsequently performed.

Specifically, the content server reads national news and/or international news released after the first time from the news queue, and uses the acquired national news and/or international news as the splash screen content.

Step 206: The content server judges whether any local news is released at the geographical location of the terminal after the first time; if released, step 207 is performed; and if not, step 208 is performed.

Specifically, the content server receives the content request, searches in the mapping relationship between geographical locations and local news queues for a corresponding local news queue, and judges whether the acquired local news queue includes any local news released after the first time; if true, the content server judges that local news is released at the geographical location of the terminal after the first time; if false, the content server judges that no local news is released at the geographical location of the terminal after the first time.

a local news queue corresponding to each geographical location is stored in the mapping relationship between geographical locations and local news queues, where the local news queue is sued to store local news released at the geographical location.

A person skilled in the art may cache recently released news at each geographical location into a local news queue corresponding to the geographical location, and release time is recorded for each piece of local news stored in the local news queue. For example, as regards Beijing, the mapping relationship between geographical locations and local news queues stores a local news queue corresponding to Beijing, and a person skilled in the art may cache local news released in Beijing into the local news queue corresponding to Beijing.

Step 207: The content server acquires the local news released after the first time, and uses the acquired local news as the splash screen content; and step 210 is subsequently performed.

Specifically, the content server reads local news released after the first time from the local news queue corresponding to the geographical location of the terminal, and uses the acquired local news as the splash screen content.

Step 208: The content server acquires current weather conditions at the geographical location of the terminal according to the geographical location of the terminal carried in the content request.

The content server may searches in a network for the current weather conditions at the geographical location of the terminal according to the geographical location of the terminal carried in the content request, where the weather conditions may include: cloudy, sunny, thunderstorm, sleet, and the like.

Step 209: The content server acquires a corresponding weather interface picture from a mapping relationship between weather conditions and weather interface pictures according to the current weather conditions, and uses the acquired weather interface picture as the splash screen content.

A person skilled in the art may assign a weather interface picture to each weather condition in advance. For example, in case of thunderstorm weather, a weather interface picture whose subject is composed of traces of rain, mist, and drops is assigned to the thunderstorm weather, and the thunderstorm weather and the weather interface assigned thereto are stored into the mapping relationship between weather conditions and weather interface pictures; in case of snow weather, a weather interface whose subject is composed of traces of frost, snow falling, accumulated snow is assigned to the sow weather, and the snow weather and the weather interface picture assigned thereto are stored into the mapping relationship between weather conditions and weather interface pictures.

Step 210: The content server sends the acquired splash screen content to the terminal.

Furthermore, if acquiring the background picture of the splash screen content, the content server may also superimpose the splash screen content and the background picture of the splash screen content, and send the splash screen content experiencing superimposition to the terminal.

Furthermore, the content server may also acquire current time, and sends the acquired current time to the terminal.

The content server may also read the current time from a clock thereof.

Furthermore, prior to sending the splash screen content to the terminal, the content server may compress the splash screen content; alternatively, prior to sending the splash screen content and the current time to the terminal, the content server may compress the splash screen content and the current time.

Step 211: The terminal receives the splash screen content from the content server, and displays the splash screen content.

Furthermore, the terminal may also receive the current time from the content server, and updates the cached first time into the received current time.

The content server sends the current time to the terminal such that the first time cached in the terminal is consistent with the time in the content server.

Furthermore, upon receiving the splash screen content from the content server, the terminal may also read the current time from a clock thereof, and updates the cached first time into the read current time.

According to the embodiments of the present disclosure, a terminal sends a content request to a content server, the content server acquires splash screen content and sends the acquired splash screen content to the terminal, and the terminal displays the splash screen content. The acquired splash screen content includes an interface picture corresponding to a geographical location of the terminal, national news and/or international news, local news released at the geographical location of the terminal, or a weather interface picture corresponding to current weather conditions at the geographical location of the terminal. In this way, the terminal displays different splash screen content. This enhances personality and interest of a terminal product, and improves user experience.

Figure 3:
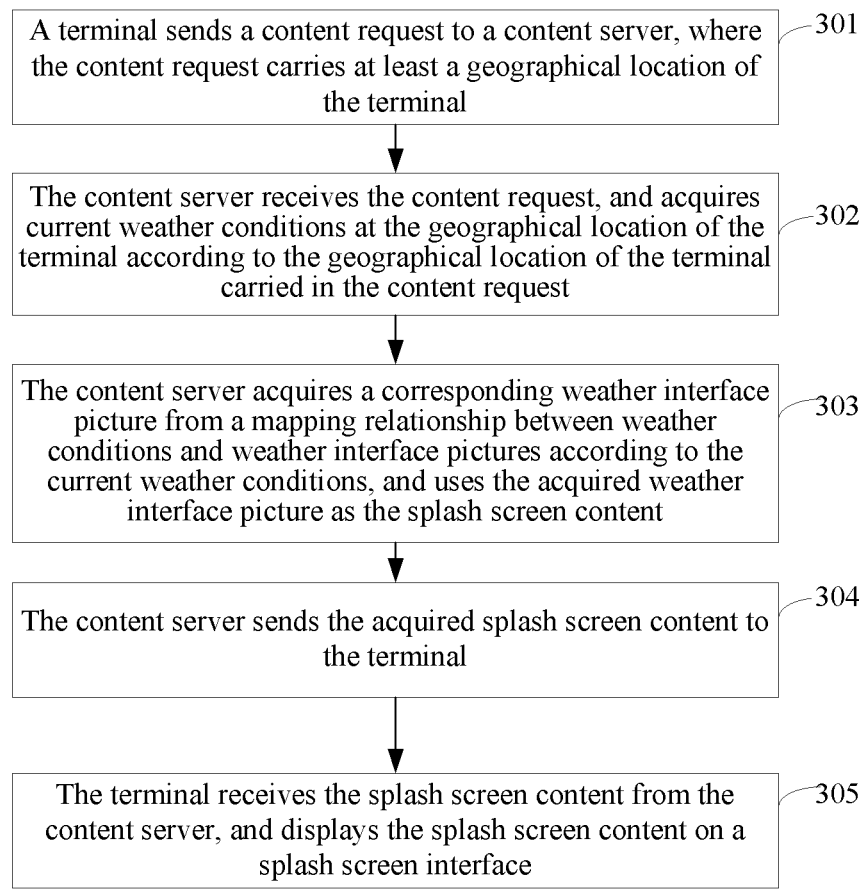
FIG. 3 is a flowchart of a method for displaying splash screen content according to an embodiment of the present disclosure.

An embodiment of the present disclosure provides a method for displaying splash screen content. When a terminal is powered on and started, the terminal displays a splash screen interface, and is capable of displaying splash screen content on the splash screen interface according to the method of this embodiment. Referring to FIG. 3, the method includes the following steps:

Step 301: A terminal sends a content request to a content server, where the content request carries at least a geographical location of the terminal.

The terminal is internally provided with a GPS positioning module, and is capable of reading the geographical location thereof from its GPS positioning module. The first time is the time when the terminal last requests splash screen content, and is pre-cached by the terminal.

Step 302: The content server receives the content request, and acquires current weather conditions at the geographical location of the terminal according to the geographical location of the terminal carried in the content request.

The content server may acquire current weather conditions at the geographical location of the terminal from the Internet according to the geographical location of the terminal carried in the content request.

The weather conditions may include: cloudy, sunny, thunderstorm, sleet, and the like.

Furthermore, upon receiving the content request, the content server may also acquire current time when receiving the content request, determine a time range that the acquired time falls within, acquire a corresponding background picture from a stored mapping relationship between time ranges and background pictures, and use the acquired background picture as a background picture of the splash screen content.

In this embodiment, a person skilled in the art may divide a whole year into a plurality of time ranges, assign a background picture to each time range, and store each time range and the background picture corresponding thereto into the mapping relationship between time ranges and background pictures.

A default background picture may be preset in the terminal, and the terminal may use the stored default background as a background picture of the splash screen content.

In this embodiment, a default background picture may be preset in the content server; correspondingly, upon receiving the content request, the content server may directly acquire the default background picture and use the default background picture as a background picture of the splash screen content.

Step 303: The content server acquires a corresponding weather interface picture from a mapping relationship between weather conditions and weather interface pictures according to the current weather conditions, and uses the acquired weather interface picture as the splash screen content.

A person skilled in the art may assign a weather interface picture to each weather condition in advance. For example, in case of thunderstorm weather, a weather interface picture whose subject is composed of traces of rain, mist, and drops is assigned to the thunderstorm weather, and the thunderstorm weather and the weather interface picture assigned thereto are stored into the mapping relationship between weather conditions and weather interface pictures; in case of snow weather, a weather interface whose subject is composed of traces of frost, snow falling, accumulated snow is assigned to the sow weather, and the snow weather and the weather interface picture assigned thereto are stored into the mapping relationship between weather conditions and weather interface pictures.

Step 304: The content server sends the acquired splash screen content to the terminal.

Furthermore, if acquiring the background picture of the splash screen content, the content server may also superimpose the splash screen content and the background picture of the splash screen content, and then send the splash screen content experiencing superimposition to the terminal.

Further, prior to sending the splash screen content, the content server may compress the splash screen content.

Step 305: The terminal receives the splash screen content from the content server, and displays the splash screen content on a splash screen interface.

According to the embodiments of the present disclosure, a terminal sends a content request to a content server, where the content request carries a geographical location of the terminal; the content server acquires a weather interface corresponding to current weather conditions at the geographical location of the terminal according to the geographical location of the terminal, and uses the acquired weather interface as the splash screen content. This enhances personality and interest of a terminal product, and improves user experience.

Figure 4:
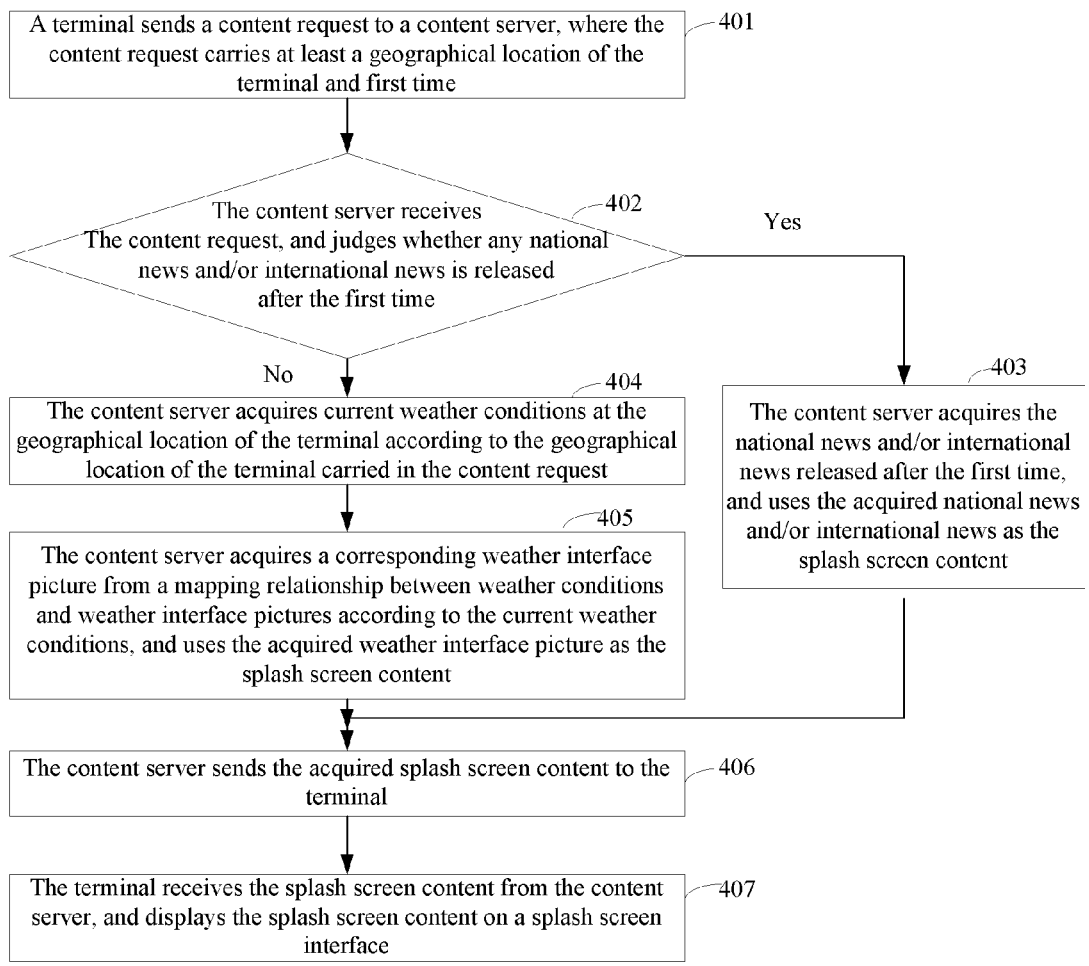
FIG. 4 is a flowchart of a method for displaying splash screen content according to an embodiment of the present disclosure.

An embodiment of the present disclosure provides a method for displaying splash screen content. When a terminal is powered on and started, the terminal displays a splash screen interface, and is capable of displaying splash screen content on the splash screen interface according to the method of this embodiment. Referring to FIG. 4, the method includes the following steps:

Step 401: A terminal sends a content request to a content server, where the content request carries at least a geographical location of the terminal and first time, where the first time is the time when the terminal last requests splash screen content.

The terminal is internally provided with a GPS positioning module, and is capable of reading the geographical location thereof from its GPS positioning module. The first time is the time when the terminal last requests splash screen content, and is pre-cached by the terminal.

Step 402: The content server receives the content request, and judges, according to the first time carried in the content request, whether any national news and/or international news is released after the first time; if released, step 403 is performed; and if not, step 404 is performed.

The content server stores a news queue which is used to cache national news and/or international news. A person skilled in the art may cache recently released national news and/or international news into the news queue in the content server. In addition, release time is recorded for each piece of national news and/or international news stored in the news queue, and the national news and/or international news includes political news, entertainment news, and/or current affair news.

Specifically, the content server receives the content request, and judges whether the new queue includes any national news and/or international news released after the first time; if true, the content server judges that national news and/or international news is released after the first time; if false, the content server judges that no national news and/or international news is released after the first time.

Furthermore, upon receiving the content request, the content server may also acquire current time when receiving the content request, determine a time range that the acquired time falls within, acquire a corresponding background picture from a stored mapping relationship between time ranges and background pictures, and use the acquired background picture as a background picture of the splash screen content.

In this embodiment, a person skilled in the art may divide a whole year into a plurality of time ranges, assign a background picture to each time range, and store each time range and the background picture corresponding thereto into the mapping relationship between time ranges and background pictures in the content server.

Step 403: The content server acquires the national news and/or international news released after the first time, and uses the acquired national news and/or international news as the splash screen content; and step 406 is subsequently performed.

Specifically, the content server reads national news and/or international news released after the first time from the news queue, and uses the acquired national news and/or international news as the splash screen content.

Step 404: The content server acquires current weather conditions at the geographical location of the terminal according to the geographical location of the terminal carried in the content request.

The content server may acquire current weather conditions at the geographical location of the terminal from the Internet according to the geographical location of the terminal carried in the content request.

Step 405: The content server acquires a corresponding weather interface from a mapping relationship between weather conditions and weather interface pictures according to the current weather conditions, and uses the acquired weather interface picture as the splash screen content.

A person skilled in the art may assign a weather interface picture to each weather condition in advance, and store each weather condition and the weather interface picture corresponding thereto into the mapping relationship between weather conditions and weather interface pictures.

Step 406: The content server sends the acquired splash screen content to the terminal.

Furthermore, if acquiring the background picture of the splash screen content, the content server may also superimpose the splash screen content and the background picture of the splash screen content, and send the splash screen content experiencing superimposition to the terminal.

Further, prior to sending the splash screen content, the content server may compress the splash screen content.

Step 407: The terminal receives the splash screen content from the content server, and displays the splash screen content on a splash screen interface.

According to the embodiments of the present disclosure, a terminal sends a content request to a content server, the content server acquires splash screen content and sends the acquired splash screen content to the terminal, and the terminal displays the splash screen content. The acquired splash screen content includes national news and/or international news, or a weather interface picture corresponding to current weather conditions at the geographical location of the terminal. This enhances personality and interest of a terminal product, and improves user experience.

Figure 5:
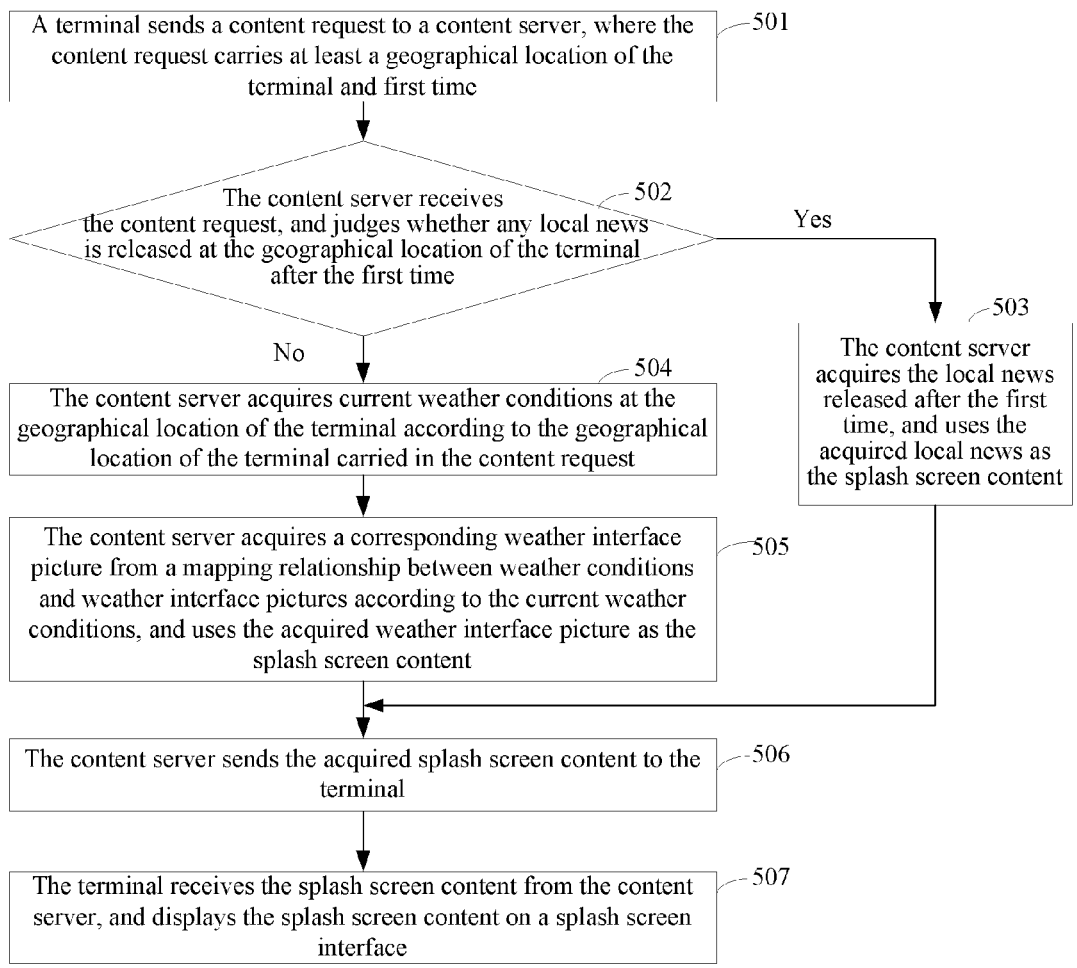
FIG. 5 is a flowchart of a method for displaying splash screen content according to an embodiment of the present disclosure.

An embodiment of the present disclosure provides a method for displaying splash screen content. When a terminal is powered on and started, the terminal displays a splash screen interface, and is capable of displaying splash screen content on the splash screen interface according to the method of this embodiment. Referring to FIG. 5, the method includes the following steps:

Step 501: A terminal sends a content request to a content server, where the content request carries at least a geographical location of the terminal and first time, where the first time is the time when the terminal last requests splash screen content.

The terminal is internally provided with a GPS positioning module, and is capable of reading the geographical location thereof from its GPS positioning module. The first time is the time when the terminal last requests splash screen content, and is pre-cached by the terminal.

Step 502: The content server receives the content request, and judges, according to the first time and the geographical location of the terminal carried in the content request, whether any local news is released at the geographical location of the terminal after the first time; if released, step 503 is performed; and if not, step 504 is performed.

The content server stores a mapping relationship between geographical locations and local news queues, a local news queue corresponding to each geographical location is stored in the mapping relationship between geographical locations and local news queues, and the local news queue is used to store local news released at each geographical location.

A person skilled in the art may cache in advance local news recently released at each geographical location into the local news queue corresponding to the each geographical location, where corresponding release time is recorded for the local news cached in the local news queue corresponding to each geographical location.

Specifically, the content server receives the content request, searches in the mapping relationship between geographical locations and local news queues for a corresponding local news queue, and judges whether the acquired local news queue includes any local news released after the first time; if true, the content server judges that local news is released at the geographical location of the terminal after the first time; if false, the content server judges that no local news is released at the geographical location of the terminal after the first time.

Furthermore, upon receiving the content request, the content server may also acquire current time when receiving the content request, determine a time range that the acquired time falls within, acquires a corresponding background picture from a stored mapping relationship between time ranges and background pictures, and use the acquired background picture as a background picture of the splash screen content.

In this embodiment, a person skilled in the art may divide a whole year into a plurality of time ranges, assign a background picture to each time range, and store each time range and the background picture corresponding thereto into the mapping relationship between time ranges and background pictures in the content server.

Step 503: The content server acquires the local news released after the first time, and uses the acquired local news as the splash screen content; and step 506 is subsequently performed.

Specifically, the content server reads local news released after the first time from the local news queue corresponding to the geographical location of the terminal, and uses the acquired local news as the splash screen content.

Step 504: The content server acquires current weather conditions at the geographical location of the terminal according to the geographical location of the terminal carried in the content request.

The content server may acquire current weather conditions at the geographical location of the terminal from the Internet according to the geographical location of the terminal carried in the content request.

Step 505: The content server acquires a corresponding weather interface picture from a mapping relationship between weather conditions and weather interface pictures according to the current weather conditions, and uses the acquired weather interface picture as the splash screen content.

A person skilled in the art may assign a weather interface picture to each weather condition in advance, and store each weather condition and the weather interface picture corresponding thereto into the mapping relationship between weather conditions and weather interface pictures.

Step 506: The content server sends the acquired splash screen content to the terminal.

Furthermore, if acquiring the background picture of the splash screen content, the content server may also superimpose the splash screen content and the background picture of the splash screen content, and send the splash screen content experiencing superimposition to the terminal.

Further, prior to sending the splash screen content, the content server may compress the splash screen content.

Step 507: The terminal receives the splash screen content from the content server, and displays the splash screen content on a splash screen interface.

According to the embodiments of the present disclosure, a terminal sends a content request to a content server, the content server acquires splash screen content and sends the acquired splash screen content to the terminal, and the terminal displays the splash screen content. The acquired splash screen content includes local news released at the geographical location of the terminal, or a weather interface picture corresponding to current weather conditions at the geographical location of the terminal. This enhances personality and interest of a terminal product, and improves user experience.

Figure 6:
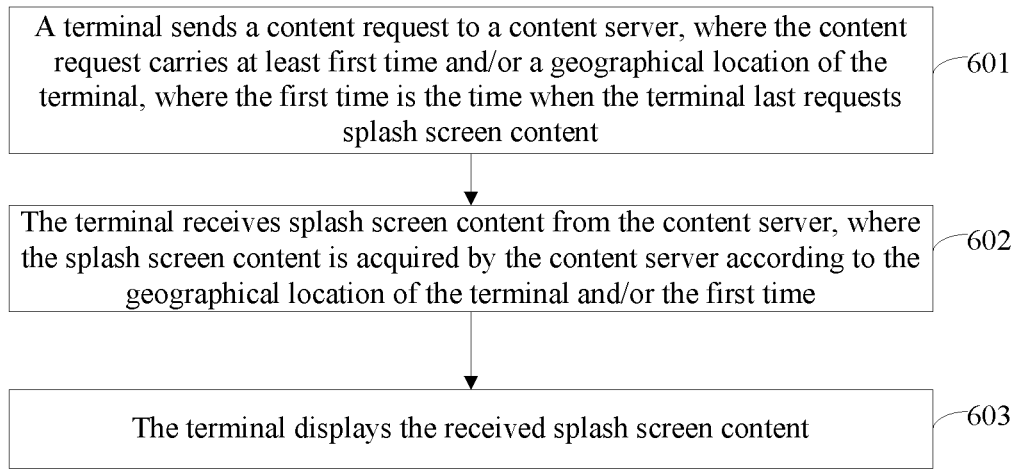
FIG. 6 is a flowchart of a method for displaying splash screen content according to an embodiment of the present disclosure.

As shown in FIG. 6, an embodiment of the present disclosure provides a method for displaying splash screen content, including:

Step 601: A terminal sends a content request to a content server, where the content request carries at least a geographical location of the terminal and/or first time, where the first time is the time when the terminal last requests splash screen content.

Step 602: The terminal receives splash screen content sent by the content server, where the splash screen content is acquired by the content server according to the geographical location of the terminal and/or the first time.

Step 603: The terminal displays the received splash screen content.

Furthermore, after performing step 602, the terminal further acquires current time, and updates the cached first time into the acquired current time.

According to the embodiments of the present disclosure, a terminal sends a content request to a content server, the content server acquires splash screen content and sends the acquired splash screen content to the terminal, and the terminal displays the splash screen content, thereby enhancing personality and interest of a terminal product, and improving user experience.

Figure 7:
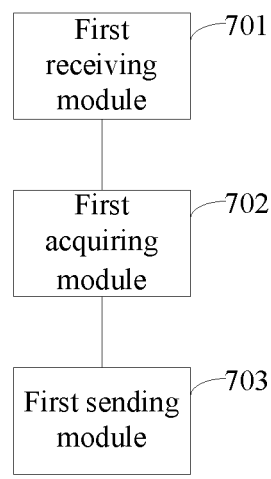
FIG. 7 is a schematic diagram of a content server according to an embodiment of the present disclosure.

As shown in FIG. 7, an embodiment of the present disclosure provides a content server, including:

a first receiving module 701, configured to receive a content request sent by a terminal, the content request carrying first time and/or a geographical location of the terminal, the first time being time when the terminal last requests splash screen content;

a first acquiring module 702, configured to acquire splash screen content according to the first time and/or the geographical location of the terminal; and a first sending module 703, configured to send the splash screen content to the terminal such that the terminal displays the splash screen content.

The first acquiring module 702 includes:

a first acquiring unit, configured to acquire current weather conditions at the geographical location of the terminal from the Internet according to the geographical location of the terminal; and a second acquiring unit, configured to acquire a corresponding weather interface picture from a mapping relationship between weather conditions and weather interface pictures according to the current weather conditions at the geographical location of the terminal, and use the acquired weather interface picture as the splash screen content.

The first acquiring module 702 includes:

a third acquiring unit, configured to: if any national news and/or international news is released after the first time, acquire the national news and/or international news released after the first time, and use the acquired national news and/or international news as the splash screen content; and a fourth acquiring unit, configured to: if no national news and/or international news is released after the first time, acquire current weather conditions at the geographical location of the terminal; and acquire a corresponding weather interface picture from a mapping relationship between weather conditions and weather interface pictures according to the acquired weather conditions, and use the acquired weather interface picture as the splash screen content.

The first acquiring module 702 includes:

a fifth acquiring unit, configured to: if local news is released at the geographical location of the terminal after the first time, acquire the local news released after the first time, and use the local news as the splash screen content; and a sixth acquiring unit, configured to: if no local news is released at the geographical location of the terminal after the first time, acquire current weather conditions at the geographical location of the terminal; and acquire a corresponding weather interface picture from a mapping relationship between weather conditions and weather interface pictures according to the acquired weather conditions, and use the acquired weather interface picture as the splash screen content.

The first acquiring module 702 includes:

a seventh acquiring unit, configured to: when it is the first time the terminal requests the splash screen content or the geographical location of the terminal has changed, acquire a corresponding interface picture from a mapping relationship between geographical locations and interface pictures according to the geographical location of the terminal, and use the acquired interface picture as the splash screen content; and an eighth acquiring unit, configured to: when it is not the first time the terminal requests the splash screen content and the geographical location of the terminal has not changed, if any national news and/or international news is released after the first time, acquire the national news and/or international news released after the first time, and use the acquired national news and/or international news as the splash screen content; and if no national news and/or international news is released after the first time, judge whether any local news is released at the geographical location of the terminal after the first time, if released, acquire the local news released after the first time and using the acquired local news as the splash screen content, and if not, acquire current weather conditions at the geographical location of the terminal; and acquire a corresponding weather interface picture from a mapping relationship between weather conditions and weather interface pictures according to the acquired weather conditions, and use the acquired weather interface picture as the splash screen content.

Furthermore, the content server further includes:

a judging module, configured to judge, according to a stored mapping relationship between terminal identifiers and geographical locations, and the identifier of the terminal, whether it is the first time the terminal requests the splash screen content and whether the geographical location of the terminal has changed.

The judging module includes:

a searching unit, configured to search in the stored mapping relationship between terminal identifiers and geographical locations for the corresponding geographical location of the terminal;

a first judging unit, configured to: if the corresponding geographical location is not found, judge that it is the first time the terminal requests the splash screen content;

a second judging unit, configured to: if the corresponding geographical location is found, judge that it is not the first time the terminal requests the splash screen content; compare the geographical location of the terminal with the found geographical location; if the two locations are the same, judge that the geographical location of the terminal has not changed; and if the two locations are different, judge that the geographical location of the terminal has changed.

Furthermore, the content server further includes:

a storing module, configured to: if it is the first time the terminal requests the splash screen content, store the identifier of the terminal and the geographical location of the terminal in the mapping relationship between terminal identifiers and geographical locations; and an updating module, configured to: if the geographical location of the terminal has changed, update the found geographical location to the geographical location of the terminal.

Furthermore, the content server further includes:

a second acquiring module, configured to acquire the time when the content request is received, determine a time range that the acquired time falls within, acquire a corresponding background picture from a stored mapping relationship between time ranges and background pictures, and use the acquired background picture as a background picture of the splash screen content;

Furthermore, the content server further includes:

a superimposing module, configured to superimpose the acquired splash screen content and the background picture of the acquired splash screen content.

Furthermore, the content server further includes:

a third acquiring module, configured to acquire current time, and send the current time to the terminal such that the terminal updates the cached first time to the current time.

Furthermore, the content server further includes:

a compressing module, configured to compress the splash screen content.

According to the embodiments of the present disclosure, a terminal sends a content request to a content server, the content server acquires splash screen content and sends the acquired splash screen content to the terminal, and the terminal displays the splash screen content. The acquired splash screen content includes an interface picture corresponding to a geographical location of the terminal, national news and/or international news, local news released at the geographical location of the terminal, or a weather interface picture corresponding to current weather conditions at the geographical location of the terminal. This enhances personality and interest of a terminal product, and improves user experience.

Figure 8:
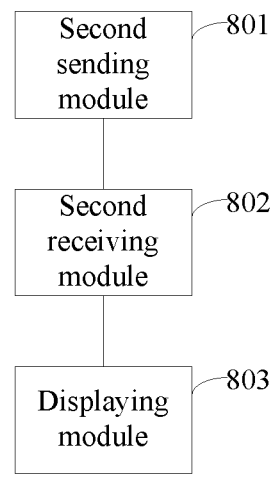
FIG. 8 is a schematic diagram of a terminal according to an embodiment of the present disclosure.

As shown in FIG. 8, an embodiment of the present disclosure provides a terminal, including:

a second sending module 801, configured to send a content request to a content server, the content request carrying at least first time and/or a geographical location of the terminal, the first time being time when the terminal last requests splash screen content;

a second receiving module 802, configured to receive splash screen content sent by the content server, the splash screen content being acquired by the content server according to the geographical location of the terminal and/or the first time; and a display module 803, configured to display the received splash screen content.

Furthermore, the terminal further includes:

an updating module, configured to acquire current time, and update the cached first time to the acquired current time.

According to the embodiments of the present disclosure, a terminal sends a content request to a server, the server acquires splash screen content and sends the acquired splash screen content to the terminal, and the terminal displays the splash screen content, thereby enhancing personality and interest of a terminal product, and improving user experience.

Figure 9:
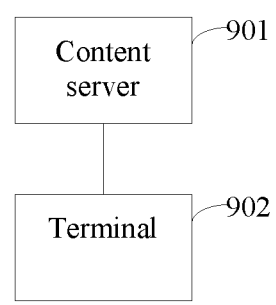
FIG. 9 is a schematic diagram of a system for displaying splash screen content according to an embodiment of the present disclosure.

As illustrated in FIG. 9, this embodiment of the present disclosure provides a system for displaying splash screen content, including a content server 901 described in the above-described embodiment and a terminal 902 described in the above-described embodiment.

A person skilled in the art should understand that all or part of steps of the preceding methods may be implemented by hardware or hardware following instructions of programs. The programs may be stored in a non-transitory computer-readable storage medium, and may be executed by at least one processor. The storage medium may be a read only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for displaying splash screen content, comprising:

receiving a content request sent by a terminal, the content request carrying both first time and a geographical location of the terminal, the first time being time when the terminal last requests splash screen content;

acquiring splash screen content according to both the first time and the geographical location of the terminal; and sending the splash screen content to the terminal such that the terminal displays the splash screen content;

wherein, the acquiring splash screen content according to the first time and the geographical location of the terminal comprises:

when it is the first time the terminal requests the splash screen content or the geographical location of the terminal has changed, acquiring a corresponding interface picture from a mapping relationship between geographical locations and interface pictures according to the geographical location of the terminal, and using the acquired interface picture as the splash screen content; and when it is not the first time the terminal requests the splash screen content and the geographical location of the terminal has not changed, if any national news and/or international news is released after the first time, acquiring the national news and/or international news released after the first time, and using the acquired national news and/or international news as the splash screen content and if no national news and/or international news is released after the first time, judging whether any local news is released at the geographical location of the terminal after the first time, if released, acquiring the local news released after the first time and using the acquired local news as the splash screen content, and if not, acquiring current weather conditions at the geographical location of the terminal; and acquiring a corresponding weather interface picture from a mapping relationship between weather conditions and weather interface pictures according to the acquired weather conditions, and using the acquired weather interface picture as the splash screen content.

2. The method according to claim 1, wherein prior to the acquiring splash screen content according to the first time and the geographical location of the terminal, the method further comprises:

judging, according to a stored mapping relationship between terminal identifiers and geographical locations, and the identifier of the terminal, whether it is the first time the terminal requests the splash screen content and whether the geographical location of the terminal has changed.

3. The method according to claim 2, wherein the judging, according to a stored mapping relationship between terminal identifiers and geographical locations, and the identifier of the terminal, whether it is the first time the terminal requests the splash screen content and whether the geographical location of the terminal has changed comprises:

searching, according to the identifier of the terminal, in the stored mapping relationship between terminal identifiers and geographical locations for the corresponding geographical location of the terminal;

if the corresponding geographical location is not found, judging that it is the first time the terminal requests the splash screen content;

if the corresponding geographical location is found, judging that it is not the first time the terminal requests the splash screen content; comparing the geographical location of the terminal with the found geographical location; if the two locations are the same, judging that the geographical location of the terminal has not changed; and if the two locations are different, judging that the geographical location of the terminal has changed.

4. The method according to claim 3, further comprising: if it is the first time the terminal requests the splash screen content, storing the identifier of the terminal and the geographical location of the terminal in the mapping relationship between terminal identifiers and geographical locations; and if the geographical location of the terminal has changed, updating the found geographical location to the geographical location of the terminal.

5. The method according to claim 1, wherein after the receiving a content request sent by a terminal, the method further comprises:

acquiring the time when the content request is received, determining a time range that the acquired time falls within, acquiring a corresponding background picture from a stored mapping relationship between time ranges and background pictures, and using the acquired background picture as a background picture of the splash screen content;

prior to the sending the splash screen content to the terminal, the method further comprises:

superimposing the splash screen content and the background picture of the splash screen content.

6. A method for displaying splash screen content, comprising:

sending, by a terminal, a content request to a content server, the content request carrying at least first time and a geographical location of the terminal, the first time being time when the terminal last requests splash screen content;

receiving, by the terminal, splash screen content from the content server, the splash screen content being acquired by the content server according to the geographical location of the terminal and the first time; and displaying, by the terminal, the received splash screen content;

wherein, the acquiring splash screen content according to the first time and the geographical location of the terminal comprises:

when it is the first time the terminal requests the splash screen content or the geographical location of the terminal has changed, acquiring a corresponding interface picture from a mapping relationship between geographical locations and interface pictures according to the geographical location of the terminal, and using the acquired interface picture as the splash screen content; and when it is not the first time the terminal requests the splash screen content and the geographical location of the terminal has not changed, if any national news and/or international news is released after the first time, acquiring the national news and/or international news released after the first time, and using the acquired national news and/or international news as the splash screen content; and if no national news and/or international news is released after the first time, judging whether any local news is released at the geographical location of the terminal after the first time, if released, acquiring the local news released after the first time and using the acquired local news as the splash screen content, and if not, acquiring current weather conditions at the geographical location of the terminal; and acquiring a corresponding weather interface picture from a mapping relationship between weather conditions and weather interface pictures according to the acquired weather conditions, and using the acquired weather interface picture as the splash screen content.

7. The method according to claim 6, wherein after the receiving splash screen content sent by the content server, the method further comprises:

acquiring, by the terminal, current time, and updating the cached first time to the acquired current time.

8. A content server, comprising:

one or more processors; and a non-transitory computer-readable storage medium storing one or more programs that, when executed by the one or more processors, cause the one or more processors to perform operations comprising:

receiving a content request sent by a terminal, the content request carrying both first time and a geographical location of the terminal, the first time being time when the terminal last requests splash screen content;

acquiring splash screen content according to both the first time and the geographical location of the terminal; and sending the splash screen content to the terminal such that the terminal displays the splash screen content;

wherein, the acquiring splash screen content according to the first time and the geographical location of the terminal comprises:

when it is the first time the terminal requests the splash screen content or the geographical location of the terminal has changed, acquiring a corresponding interface picture from a mapping relationship between geographical locations and interface pictures according to the geographical location of the terminal, and using the acquired interface picture as the splash screen content; and when it is not the first time the terminal requests the splash screen content and the geographical location of the terminal has not changed, if any national news and/or international news is released after the first time, acquiring the national news and/or international news released after the first time, and using the acquired national news and/or international news as the splash screen content; and if no national news and/or international news is released after the first time, judging whether any local news is released at the geographical location of the terminal after the first time, if released, acquiring the local news released after the first time and using the acquired local news as the splash screen content, and if not, acquiring current weather conditions at the geographical location of the terminal; and acquiring a corresponding weather interface picture from a mapping relationship between weather conditions and weather interface pictures according to the acquired weather conditions, and using the acquired weather interface picture as the slash screen content.

9. The content server according to claim 8, wherein the operations further comprise:

judging, according to a stored mapping relationship between terminal identifiers and geographical locations, and the identifier of the terminal, whether it is the first time the terminal requests the splash screen content and whether the geographical location of the terminal has changed.

10. The content server according to claim 9, wherein the operations further comprise:

searching, according to the identifier of the terminal, in the stored mapping relationship between terminal identifiers and geographical locations for the corresponding geographical location of the terminal;

if the corresponding geographical location is not found, judging that it is the first time the terminal requests the splash screen content;

if the corresponding geographical location is found, judging that it is not the first time the terminal requests the splash screen content; comparing the geographical location of the terminal with the found geographical location; if the two locations are the same, judging that the geographical location of the terminal has not changed; and if the two locations are different, judging that the geographical location of the terminal has changed.

11. The content server according to claim 10, the operations further comprise:

if it is the first time the terminal requests the splash screen content, storing the identifier of the terminal and the geographical location of the terminal in the mapping relationship between terminal identifiers and geographical locations; and if the geographical location of the terminal has changed, updating the found geographical location to the geographical location of the terminal.

12. The content server according to claim 8, the operations further comprise:

acquiring the time when the content request is received, determining a time range that the acquired time falls within, acquiring a corresponding background picture from a stored mapping relationship between time ranges and background pictures, and using the acquired background picture as a background picture of the splash screen content;

superimposing the splash screen content and the background picture of the splash screen content.

* * * * *